US011486546B2

(12) United States Patent
Park et al.

(10) Patent No.: US 11,486,546 B2
(45) Date of Patent: Nov. 1, 2022

(54) LNG BUNKERING EQUIPMENT TEST AND EVALUATION SYSTEM

(71) Applicant: Korea Marine Equipment Research Institute, Busan (KR)

(72) Inventors: Jae Hyoun Park, Busan (KR); Jae Hwan Bae, Busan (KR); Jin Won Jung, Gyeongsangnam-do (KR); Soo Sung Jeon, Busan (KR); Bong Jae Shin, Busan (KR); Young Hun Jeon, Busan (KR); Ji Hyun Jung, Busan (KR); Dae Hwan Kim, Gyeongsangnam-do (KR); Soon Hyeong Kwon, Gyeongsangbuk-do (KR); Kyu Eun Shim, Busan (KR); Jeong Hwan Kim, Busan (KR)

(73) Assignee: KOREA MARINE EQUIPMENT RESEARCH INSTITUTE, Busan (KR)

( * ) Notice: Subject to any disclaimer, the term of this patent is extended or adjusted under 35 U.S.C. 154(b) by 69 days.

(21) Appl. No.: 17/051,174

(22) PCT Filed: Jul. 15, 2019

(86) PCT No.: PCT/KR2019/008688
§ 371 (c)(1),
(2) Date: Oct. 28, 2020

(87) PCT Pub. No.: WO2020/032406
PCT Pub. Date: Feb. 13, 2020

(65) Prior Publication Data
US 2021/0372571 A1    Dec. 2, 2021

(30) Foreign Application Priority Data

Aug. 9, 2018 (KR) .......................... 10-2018-0093180

(51) Int. Cl.
*F17C 9/02* (2006.01)

(52) U.S. Cl.
CPC ........ *F17C 9/02* (2013.01); *F17C 2205/0326* (2013.01); *F17C 2221/033* (2013.01);
(Continued)

(58) Field of Classification Search
CPC ................ F17C 9/02; F17C 2205/0326; F17C 2221/033; F17C 2227/0135;
(Continued)

(56) References Cited

U.S. PATENT DOCUMENTS 9,666,093 B2 * 5/2017 In .......................... G01M 17/007
2004/0182090 A1 * 9/2004 Feger ........................ B63J 3/02
62/7

(Continued)

FOREIGN PATENT DOCUMENTS

CN    105784402 A    7/2016
CN    106441964 A    2/2017
(Continued)

OTHER PUBLICATIONS

Mun-Sung Kim et al., Offloading Operability of Small Scale AG FLNG With Side-By-Side Moored Small Scale LNG Carrier in Offshore West Africa, the 36th International Conference on Ocean, Offshore and Arctic Engineering OMAE, 2017, pp. 1-11.
(Continued)

*Primary Examiner* — Matthew W Jellett
(74) *Attorney, Agent, or Firm* — Bayramoglu Law Offices LLC (57) ABSTRACT

A liquefied natural gas (LNG) bunkering equipment test and evaluation system is provided. The system includes a storage tank module configured to store a liquefied natural gas, a supply module for connecting the storage tank module and the bunkering module, a bunkering module configured to
(Continued)

perform bunkering by being supplied with the liquefied natural gas, a simulation module provided at a part under the bunkering module and the supply module and the simulation module is configured to simulate a maritime situation by giving a fluidity to the bunkering module and the supply module, and a controller configured to control a driving of the simulation module, thereby simulating various situations of sea areas by giving fluidity to the storage tank module and the bunkering module.

9 Claims, 3 Drawing Sheets

(52) U.S. Cl.
CPC ............... $F17C\ 2227/0135$ (2013.01); $F17C\ 2227/0341$ (2013.01); $F17C\ 2250/032$ (2013.01)

(58) Field of Classification Search
CPC ........ F17C 2227/0341; F17C 2250/032; F17C 2223/0161; G01M 7/022; G01M 7/06; G01M 99/008
USPC .......................................................... 62/49.1
See application file for complete search history.

(56) References Cited

U.S. PATENT DOCUMENTS

| | | | |
|---|---|---|---|
| 2016/0116376 A1* | 4/2016 | Roodenburg | E21B 15/04 73/865.6 |
| 2016/0148526 A1* | 5/2016 | Morris | A63G 31/16 434/62 |
| 2019/0024847 A1* | 1/2019 | Hutchins | F17C 3/025 |

FOREIGN PATENT DOCUMENTS

| | | |
|---|---|---|
| CN | 107505111 A | 12/2017 |
| KR | 20140127459 A | 11/2014 |
| KR | 20150068062 A | 6/2015 |
| KR | 20150080088 A | 7/2015 |
| KR | 20170114207 A | 10/2017 |

OTHER PUBLICATIONS

Dong-Woo Jung et al., Experimental Study on Floating LNG Bunkering Terminal for Assessment of Loading and Offloading Performance, Journal of Ocean Engineering and Technology, 2018, pp. 51-61, vol. 32, No. 1.

\* cited by examiner

LNG BUNKERING EQUIPMENT TEST AND EVALUATION SYSTEM

CROSS REFERENCE TO THE RELATED APPLICATIONS

This application is the national stage entry of International Application No. PCT/KR2019/008688, filed on Jul. 15, 2019, which is based upon and claims priority to Korean Patent Application No. 10-2018-0093180, filed on Aug. 9, 2018, the entire contents of which are incorporated herein by reference.

TECHNICAL FIELD

The present disclosure relates to an LNG bunkering equipment test and evaluation system and, more particularly, to a provision of a system that enables safety and performance tests of LNG bunkering equipment for actual operation conditions by building equipment that is capable of simulating a maritime situation.

BACKGROUND

In terms of preparing for environmental regulations to prevent global warming and climate change, countries around the world are focusing on developing ships, which use eco-friendly and low-carbon fuel, due to strengthening of international ship emission regulations. In addition, the International Maritime Organization (IMO), the European Union, the United States, and the like are expected to significantly strengthen regulations on pollutants emitted from ships in line with global climate change and air pollution increases.

In order to reduce greenhouse gas emissions from ships, the IMO has proposed targets to reduce emissions by 20% by 2020 and 50% by 2050 with ship emissions in 2005 as a reference.

In this regard, as the most promising alternative, liquefied natural gas (LNG) is being considered as a fuel that is for propulsion of ships instead of diesel fuel that emits large amounts of pollutants.

LNG is a liquefied gaseous natural gas, and since a volume of LNG is decreased to about one 600th compared with that of a gaseous state, LNG is most efficient for long-distance transportation.

Ships such as the above are divided into ships (hereinafter referred to as "LNG propulsion ships") that use LNG as fuel and ships (hereinafter referred to as "LNG bunkering ships") that receive and store LNG and then fuel other ships later. In addition, there are also ships (hereinafter referred to as "LNG carriers") that supply the LNG to gasoline facilities (hereinafter referred to as "LNG Bunkering Terminal"), which store LNG transported from the LNG production base and fuel the LNG propulsion ships or LNG bunkering ships.

LNG is a clean fuel that does not contain sulfur and does not need to have a separate fuel processing system, so there would be no price increase even if regulations were applied to ship emission. In this regard, Korean shipbuilders are predicting that LNG propulsion ships will become a new source of revenue in the next few years, and the Korean government is also actively developing technologies related to LNG propulsion ships, LNG bunkering ships, as well as floating LNG bunkering terminals.

Overseas, research and development on LNG-related technologies are in progress, mainly in Europe and North America, and LNG bunkering facilities have been established and operated in many countries in Europe. In particular, the Netherlands has the most advanced bunkering test and evaluation technology.

On the other hand, in Korea, there is a need for government support for vitalizing LNG bunkering-based projects and introducing port LNG bunkering systems.

Since there is no test and evaluation infrastructure for domestically developed LNG-related equipment (bunkering field), performance evaluation of the LNG-related equipment is impossible, so the commercialization of domestic products is difficult.

More specifically, it is a reality that Korea has no system capable of simulating and testing an actual bunkering situation.

Therefore, for the commercialization of domestically developed products, it is necessary to establish a system and testing infrastructure that is capable of carrying out performance testing and evaluation of LNG bunkering equipment for the actual operational situation by simulating the actual bunkering situation and by simulating at the same time various maritime situations.

The foregoing is intended merely to aid in the understanding of the background of the present disclosure and is not intended to mean that the present disclosure falls within the purview of the related art that is already known to those skilled in the art.

Accordingly, the present disclosure has been made keeping in mind the above problems occurring in the related art, and the present disclosure is, for strengthening capabilities to develop and commercialize equipment and technology, to provide a system to carry out an evaluation of the safety and performance of LNG bunkering equipment for an actual operational situation, wherein the system is built to be able to simulate an actual bunkering situation as well as various maritime situations at the same time.

SUMMARY

In order to achieve the above objectives, according to the present disclosure, there may be provided an LNG bunkering equipment test and evaluation system, the system including:

a storage tank module configured to store liquefied natural gas; a bunkering module configured to perform bunkering by being supplied with liquefied natural gas stored in the storage tank module; a supply module connecting the storage tank module and the bunkering module to each other and configured to supply the liquefied natural gas stored in the storage tank module to the bunkering module; a simulation module provided at a part under the bunkering module and the supply module and configured to simulate a maritime situation by giving fluidity to the bunkering module and the supply module; and a controller configured to control driving of the simulation module, wherein the supply module includes: at least one pump installed at one side of the storage tank module and configured to discharge the liquefied natural gas stored in the storage tank module to an outside; and a supply line connected to the pump and served as a passageway through which the discharged liquefied natural gas is transferred to the bunkering module.

In addition, the controller may be interlocked with the simulation module, thereby controlling the simulation module to make a linear motion or rotational motion at certain time period and angle.

In addition, the supply line may be configured to have one side connected to the pump, and an opposite side provided with a loading arm having a coupler for connecting with the bunkering module or with a supply hose having a connection part for connecting with the bunkering module.

In addition, the bunkering module may include: a first bunkering station configured to receive liquefied natural gas from the storage tank module, and to store the liquefied natural gas therein, and to outflow the stored liquefied natural gas; and a second bunkering station configured to receive the liquefied natural gas flowing out from the first bunkering station.

In addition, the first bunkering station and the second bunkering station may be connected to each other by at least one supply hose, wherein the supply hose has couplers to which the first bunkering station and the second bunkering station are connected, respectively, at opposite ends.

In addition, each of the first bunkering station and the second bunkering station may include an emergency stop unit configured to block a flow path of the bunkering module by detecting an abnormal situation of the bunkering module.

In addition, the emergency stop unit may include: a detection sensor configured to detect an abnormal situation of the bunkering module in real-time; at least one shutdown valve configured to block the flow path between the first bunkering station and the second bunkering station in the abnormal situation; and valve control means configured to control an operation of the shutdown valve according to the operation of the detection sensor.

In addition, the system may further include: at least one reliquefaction module configured to reliquefy evaporated vapor generated from the liquefied natural gas and to retransfer the reliquefied evaporated vapor to the storage tank module.

In addition, the reliquefaction module may use nitrogen gas as a refrigerant, and the evaporated vapor may be reliquefied through heat exchange with the nitrogen gas.

In addition, the reliquefaction module may include: a liquefied nitrogen supplier configured to supply liquefied nitrogen generated by cooling the nitrogen gas under pressure; a heat exchanger configured to reliquefy the evaporated vapor through heat exchange between the liquefied nitrogen supplied from the liquefied nitrogen supplier and the evaporated vapor; and an outlet configured to retransfer the evaporated vapor reliquefied by the heat exchanger to the storage tank module.

In addition, the system may further include: a carburetor module configured to generate the evaporated vapor by vaporizing the liquefied natural gas and to transfer the evaporated vapor to the reliquefaction module.

Advantageous Effects

As described above, an LNG bunkering equipment test and evaluation system according to the present disclosure introduces a storage tank module, a supply module, and a bunkering module, thereby simulating an actual bunkering situation. In addition, the system adds a simulation module as a maritime situation simulation system, thereby simulating various situations of sea areas by giving fluidity to the storage tank module and the bunkering module. Consequentially, the system makes it possible for stability and performance evaluation for an actual operation situation of an equipment product used in the storage tank module and bunkering module to be accomplished.

DESCRIPTION OF THE REFERENCE NUMERALS IN THE DRAWINGS

100: storage tank module
110: supply tank
111: supply port
113: input port
200: bunkering module
210: first bunkering station
230: second bunkering station
300: supply module
310: pump
330: supply line
400: simulation module
500: carburetor module
600: reliquefaction module
610: liquefied nitrogen supplier
630: heat exchanger
650: discharge port
700: emergency stop unit
710: shutdown valve
LA: loading arm
SH: supply hose
DC: coupler
EL: discharge line

DETAILED DESCRIPTION OF THE EMBODIMENTS

In order to fully understand operational advantages of the present disclosure and objectives achieved by the implementation of the present disclosure, reference should be made to the accompanying drawings illustrating exemplary embodiments of the present disclosure and the contents described in the accompanying drawings.

Hereinafter, a configuration and an operation of the exemplary embodiment of the present disclosure will be described in detail with reference to the accompanying drawings. Here, in assigning reference numerals to elements of each drawing, it should be noted that the same numerals are marked for the same elements as is possible, even if indicated on different drawings.

In addition, the following embodiments may be modified in various forms, and the scope of the present disclosure is not limited to the following embodiments.

In addition, in the present specification, evaporated vapor refers to a gas vaporized into a gas state from a liquefied natural gas in a liquid state such as boil-off gas (BOG), flash gas, and the like into a gaseous state. In addition, the evaporated vapor is a concept that includes not only gas vaporized by external heat but also all gas vaporized by such as rollover (convection phenomenon), pressure inside a tank, a pressure difference between the inside and outside of the tank, a pump work, and the like.

Even though evaporation vapor is a concept including both the BOG and flash gas described above, when it is necessary to differentiate and describe the BOG and flash gas, the BOG and flash gas may even be described by being distinguished.

Hereinafter, an LNG bunkering equipment test and evaluation system according to the present disclosure will be described with reference to the drawings.

Figure 1:
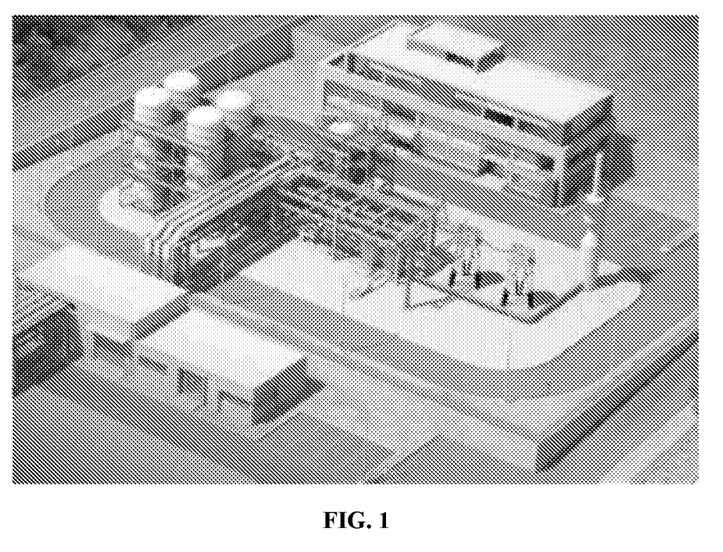
FIG. 1 is a schematic diagram showing a state in which an LNG bunkering equipment test and evaluation system according to the present disclosure is constructed.
Figure 2:
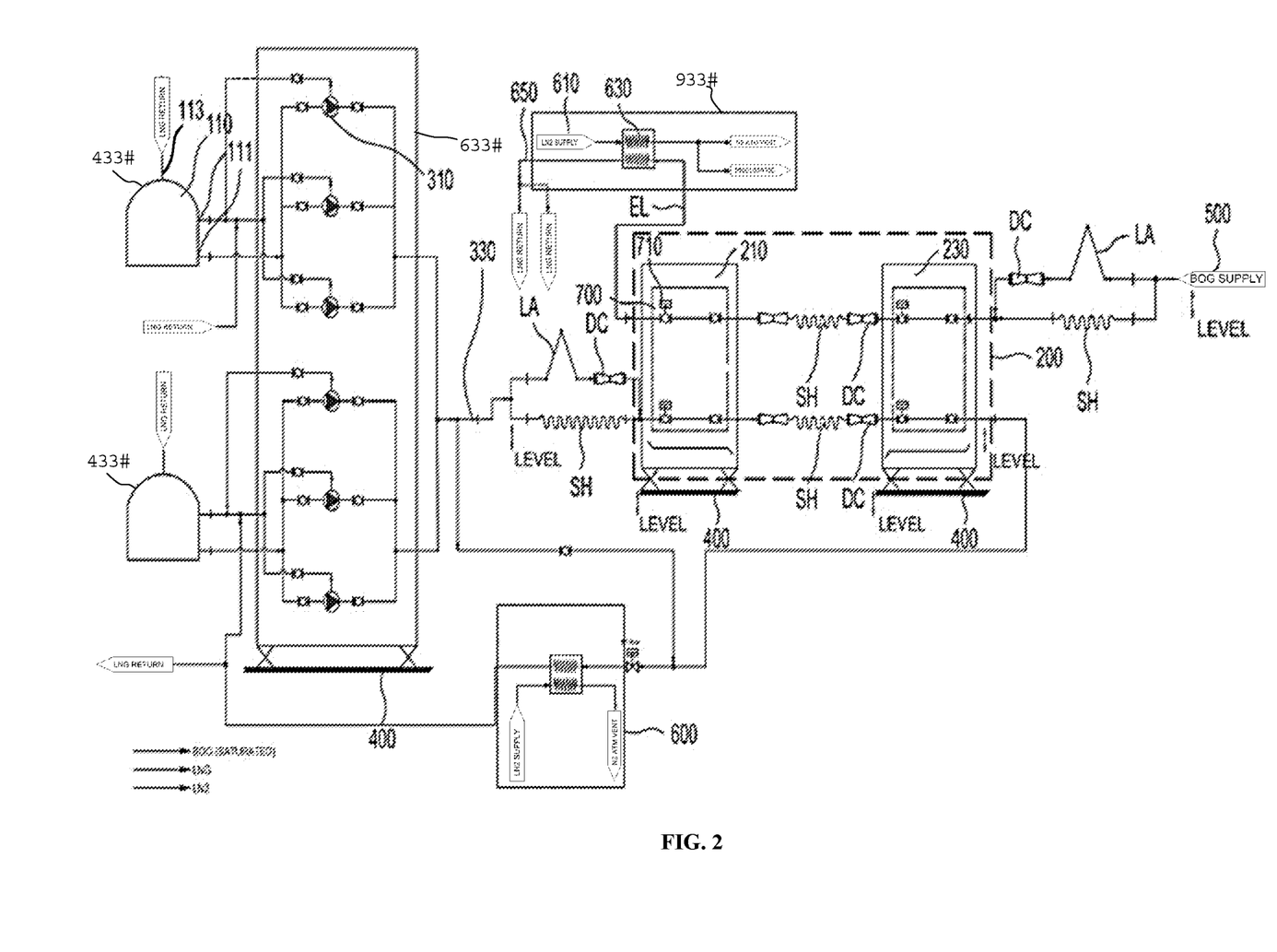
FIG. 2 is a block diagram showing the LNG bunkering equipment test and evaluation system according to the present disclosure.

FIG. 1 is a schematic diagram showing a state in which the LNG bunkering equipment test and evaluation system according to the present disclosure is constructed, and FIG. 2 is a block diagram showing the LNG bunkering equipment test and evaluation system according to the present disclosure.

Hereinafter, a configuration of the LNG bunkering equipment test and evaluation system according to the present disclosure will be described in detail with reference to FIG. 2.

First, as shown in FIG. 2, the LNG bunkering equipment test and evaluation system according to the present disclosure may include a storage tank module 100, a bunkering module 200, a supply module 300, a simulation module 400, a controller (not shown), a carburetor module 500, and a reliquefaction module 600.

Here, the storage tank module 100 includes at least one supply tank 110 configured to store liquefied natural gas to be supplied to the bunkering module 200.

In addition, the supply tank 110 is provided with a supply port 111 and an input port 113.

The supply port 111 is an opening through which the liquefied natural gas to be supplied to the bunkering module 200 is discharged, and the input port 113 is an opening through which the evaporated vapor reliquefied by the reliquefaction module 600 to be described later is input. Meanwhile, details of the supply port 111 will be described later.

In addition, the supply tank 110 stores the liquefied natural gas in a liquid form.

However, since the liquefaction temperature of the liquefied natural gas is a cryogenic temperature of about −163° C. at normal pressure, the liquefied natural gas is evaporated when the temperature is even only slightly higher than −163° C. at normal pressure.

Therefore, even when the supply tank 110 is insulated, external heat is continuously delivered to the liquefied natural gas, so the liquefied natural gas may be continuously vaporized in the supply tank 110.

Because of a phenomenon above, the BOG is generated in the supply tank 110, so the internal pressure of the supply tank 110 may increase. Accordingly, the supply tank 110 may be in the form of a pressure tank.

Even when the supply tank 110 is in the form of the pressure tank, the evaporated vapor may be discharged to the outside of the supply tank 110 in order to prevent the pressure inside the supply tank 110 from continuously increasing.

Accordingly, the evaporated vapor may be discharged to the outside or may be reliquefied by the reliquefaction module 600 to be described later and sent back to the supply tank 110.

In addition, a supply module 300 is installed at one side of the storage tank module 100.

Hereinafter, the supply module 300 will be described in detail.

The supply module 300 connects between the storage tank module 100 and the bunkering module 200 and serves to supply the liquefied natural gas stored in the storage tank module 100 to the bunkering module 200.

In addition, the supply module 300 includes: at least one pump 310 installed at one side of the supply port 111 of the storage tank and configured to discharge the liquefied natural gas stored in the storage tank module 100 to the outside; and a supply line 330 that is connected to the pump 310 and is a passageway through which the discharged liquefied natural gas is transferred to the bunkering module 200.

First, the liquefied natural gas stored in the supply tank 110 is discharged to the outside by the operation of the pump 310.

In this case, the pump 310 may be a booster pump.

Meanwhile, the booster pump is a system that efficiently starts and stops the pump in response to changes in the required flow rate and head at a place of use by connecting a high-efficiency pump with a pipe and using an automatic control system, thereby maintaining the best pumping fluid pressure and flow rate according to a need.

In this case, in the present disclosure, various pumps other than the booster pump may be used as the pump 310, and the spirit of the present disclosure is not limited by types of such pumps.

In addition, the pump 310 may be replaced with a test pump that is to be tested, and the LNG bunkering equipment test and evaluation system may be operated with the test pump replacing the pump, thereby performing a performance test of the test pump.

Meanwhile, the liquefied natural gas discharged through the pump 310 is transferred to the bunkering module 200 through the supply line 330.

At this time, the supply line 330 may be configured to have one side connected to the pump 310 and an opposite side provided with a loading arm LA having a coupler DC for connecting with the bunkering module 200 or with a supply hose SH having a connection part (not shown) for connecting with the bunkering module 200.

Therefore, the bunkering module 200 should be provided with a connection member to be connected to the coupler DC or the connection part (not shown) at a connection portion with the supply line 330 so as to be connected to the supply line.

In addition, the coupler DC may be installed at an end of the loading arm LA to allow the loading arm LA to be quickly fastened to and separated from the bunkering module 200 and configured as a quick connect & disconnect coupler (QCDC) type that shortens the unloading work time.

That is, the coupler DC is installed at the connection portion between the supply line 330 (more specifically, the end of the loading arm LA) and the bunkering module 200) and, when an emergency situation occurs (in case of occurrence of various dangerous situations in which liquid gas unloading should be stopped) during unloading of the liquefied natural gas, is to enable the loading arm LA to be safely and quickly separated from the bunkering module 200 in order to minimize the outflow of the liquefied natural gas.

In addition, the coupler DC is configured to quickly open and close a clamp by a separate hydraulic cylinder and serves to save time required for unloading work.

In addition, the supply hose SH may be configured in a form of a flexible hose that provides excellent flexibility and bending resistance in a corrugated shape.

Hereinafter, the bunkering module 200 to which the liquefied natural gas stored in the storage tank module 100 is supplied, whereby bunkering is accomplished will be described.

The bunkering module 200 includes a first bunkering station 210 and a second bunkering station 230.

More specifically, the first bunkering station 210 receives the liquefied natural gas from the storage tank module 100 through the supply module 300 and stores the liquefied natural gas therein, and supplies the stored liquefied natural gas to the second bunkering station 230.

That is, the first bunkering station 210 and the second bunkering station 230 are connected to each other with the supply hose SH to allow bunkering of supplying liquefied natural gas to be performed, and the second bunkering station 230 may be used to refer to include all ships receiving liquefied natural gas, including ships using liquefied natural gas as fuel.

In addition, the first bunkering station 210 and the second bunkering station 230 are connected to each other with at least one supply hose SH, and each of opposite ends of the supply hose SH is formed to have the coupler DC attached thereto.

The supply hose SH may be configured in the form of the flexible hose that provides excellent flexibility and bending resistance in the corrugated shape.

In addition, as described above, through the supply hose SH, the liquefied natural gas may be transferred or the evaporated vapor generated from the liquefied natural gas may also be transferred.

More specifically, during the bunkering work, the liquefied natural gas is transferred from the first bunkering station 210 to the second bunkering station 230.

In addition, the reliquefaction module 600 to be described later is connected to the first bunkering station 210, and the evaporated vapor generated from the bunkering module 200 is transferred to the reliquefaction module 600 through the first bunkering station 210. Accordingly, the evaporated vapor is to be transferred from the second bunkering station 230 to the first bunkering station 210. Meanwhile, details of the reliquefaction module 600 will be described later.

In addition, the coupler DC is configured to be the QCDC type, thereby enabling the supply hose SH to be safely and quickly separated from the first bunkering station 210 and the second bunkering station 230 when an emergency event occurs during an unloading operation of the liquefied natural gas.

In addition, the first bunkering station 210 and the second bunkering station 230 each include emergency stop units 700.

The emergency stop unit 700 is a device capable of controlling the opening and closing of the flow path of the bunkering module 200 and blocks the flow path of the bunkering module 200 by detecting an abnormal situation of the bunkering module 200, thereby preventing dangerous situations from occurring.

In addition, when an emergency situation occurs during a bunkering situation, the emergency stop unit 700 enables to quickly cut off and separate the connection structure between the first bunkering station 210 and the second bunkering station 230 by sensing the emergency situation, thereby allowing prompt response to the emergency situation to be established.

That is, the emergency stop unit 700 includes a detection sensor (not shown), a shutdown valve 710, and a valve control means (not shown). Hereinafter, each of the above configurations will be described in detail.

First, the detection sensor detects an abnormal situation including an abnormal connection state of the bunkering module 200.

Thereafter, the abnormal signal output by the operation of the detection sensor is transmitted to the valve control means, and the valve control means determines whether there is an abnormal situation by synthesizing the received abnormal signals, thereby controlling the operation of the shutdown valve 710.

The shutdown valve 710 is installed in each of the flow paths of the bunkering module 200 and stops the transfer and supply of liquefied natural gas by blocking the flow path in an emergency.

As described above, by providing the emergency stop unit 700, an abnormal situation is detected in real-time, whereby an accurate and quick response is possible.

In addition, there is an effect of preventing a secondary disaster by blocking the flow path.

In the following, a simulation module 400 that is provided at a part under the bunkering module 200 and the supply module 300 and gives fluidity to the bunkering module 200 and the supply module 300, thereby simulating a maritime situation will be described.

The simulation module 400 enables stability and performance evaluation tests of equipment products of the bunkering module 200 and the supply module 300 to be accomplished by simulating an actual maritime situation.

In actual maritime situations, factors that cause fluctuation of the ship include various elements including sea conditions, direction and strength of ocean currents, wind direction, and wind speed. However, hereinafter, a motion by the flow of seawater will be mainly described, but not necessarily be limited thereto.

That is, hereinafter, the simulation of motions of six degrees of freedom due to the flow of seawater will be described with reference to FIG. 3.

The simulation module 400 may simulate the motions of the six degrees of freedom, thereby giving motions due to the flow of seawater to the bunkering module 200 and the supply module 300.

Meanwhile, the motions of the six degrees of freedom refer to vibrational motions received by marine waves by a ship sailing on the sea surface, and the vibration applied to the vessel is classified into three linear motions and three rotational motions.

Figure 3:
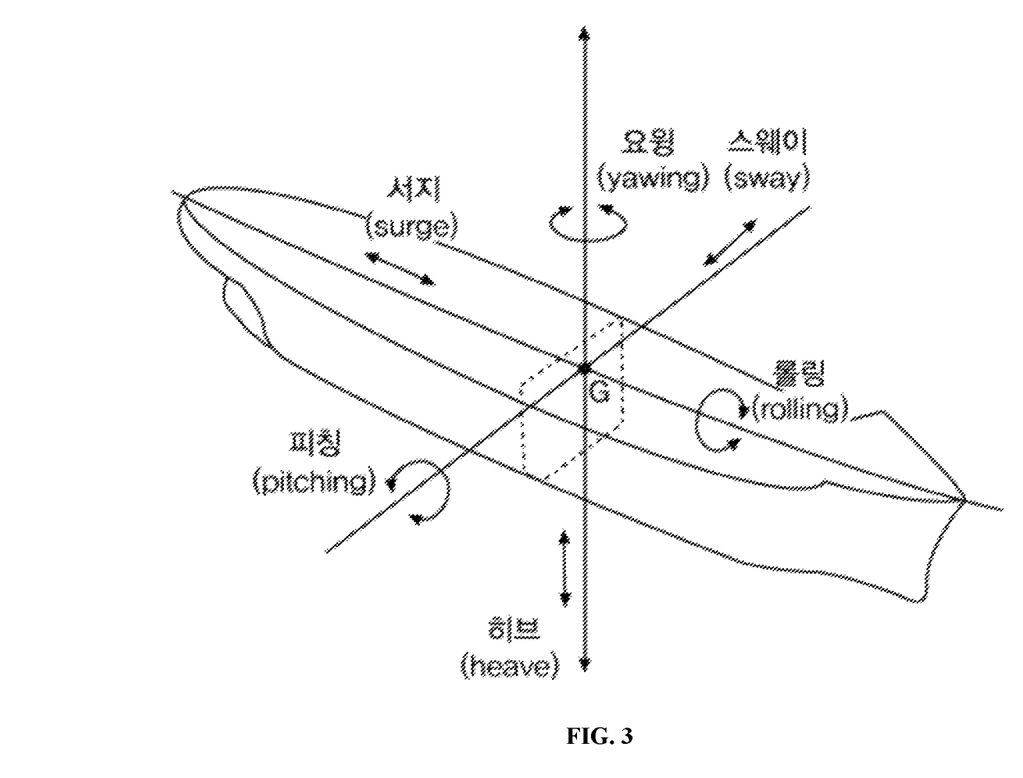
FIG. 3 is a view showing motions of six degrees of freedom by a simulation module of the LNG bunkering equipment test and evaluation system according to the present disclosure.

More specifically, as shown in FIG. 3, the linear motion is composed of a surge (linear motion moving back and forth in a traveling direction of a hull), a sway (linear motion moving in a transverse direction of the hull), and a heave (linear motion moving in a vertical direction of the hull).

In addition, the rotational motion is composed of a rolling (rotational motion with a longitudinal axis of the ship as a reference), a pitching (rotational motion with a width direction of the ship as a reference), and a yawing (rotational motion with a vertical axis of the ship as a reference).

Acceleration (local acceleration) acts on a system and equipment at arbitrary positions of the ship by the motions of the six degrees of freedom of the ship, and the operating state of the system and equipment is affected according to a level of the acceleration.

That is, the simulation module 400 is driven so that the above-described motions are applied to the bunkering module 200 and the supply module 300, thereby providing stability and performance tests to be accomplished for the actual operation situation through the actual maritime situation simulation.

In addition, the driving of the simulation module 400 described above is controlled by the controller (not shown).

Specifically, the controller may be interlocked with the simulation module, thereby driving the simulation module in a manner of constantly adjusting the motions of the bunkering module and the supply module so that the bunkering module and the supply module are swayed at an arbitrary time period and angle.

Next, the reliquefaction module 600 will be described.

The reliquefaction module 600 serves to reliquefy the evaporated vapor generated from the liquefied natural gas and retransfer the reliquefied evaporated vapor to the storage tank module 100.

The evaporated vapor is continuously generated due to heat inflow from the outside and mainly occurs in the tank in which the liquefied natural gas is stored or the passageway through which the liquefied natural gas is transferred.

Accordingly, the reliquefaction module 600 may be installed by being connected to the first bunkering station 210, which stores the liquefied natural gas and performs the bunkering, and an installation location thereof is not limited.

In addition, when the reliquefaction module 600 is installed by being connected to the first bunkering station 210, all of the evaporated vapor generated in the bunkering module 200 including the first bunkering station 210 and the second bunkering station 230 is delivered to the reliquefaction module 600 through the first bunkering station 210.

More specifically, the evaporated vapor generated in the second bunkering station 230 passes through the first bunkering station 210 via the supply hose SH and is reliquefied after being transferred to the reliquefaction module 600.

In addition, the reliquefaction module 600 uses nitrogen gas as a refrigerant for reliquefying the evaporated vapor, wherein the evaporated vapor is reliquefied through heat exchange with the nitrogen gas, and includes a liquefied nitrogen supplier 610, a heat exchanger 630, and a discharge port 650.

Hereinafter, the reliquefaction steps will be described in detail on the basis of each of the above configurations.

First, the liquefied nitrogen supplier 610 produces liquefied nitrogen by cooling the nitrogen gas under pressure and transfers the produced liquefied nitrogen to the heat exchanger 630.

Thereafter, the evaporated vapor generated from the bunkering module 200 passes through the first bunkering station 210 and is transferred to the heat exchanger 630 of the reliquefaction module 600 along a discharge line EL, and the transferred evaporated vapor is reliquefied as heat exchange with liquid nitrogen is accomplished.

The reliquefied evaporated vapor is discharged through the discharge port 650, passes through the input port 113 of the storage tank module 100, and is recovered into the storage tank again.

In addition, the liquid nitrogen vaporized through the heat exchange may be discharged to the outside or may be recovered again and reused.

That is, by introducing the reliquefaction module 600, the vaporized vapor generated when the LNG bunkering test and evaluation are progressed may be reliquefied and reused.

Meanwhile, in order to evaluate the performance of the reliquefaction module 600, a device configured to generate the evaporated vapor by artificially vaporizing the liquefied natural gas may be further provided.

In the case of using the evaporated vapor generated by the evaporation of the liquefied natural gas, the capacity of natural vaporization by atmospheric temperature may not meet the capacity for the purpose of use, so there is a need for a kind of heat exchanger that applies heat to the liquefied natural gas as much as the latent heat of vaporization and forcibly vaporizes the liquefied natural gas.

To this end, a configuration of the carburetor module 500 for generating controllable evaporated vapor is required.

The carburetor module 500 generates evaporated vapor by vaporizing the liquefied natural gas present in a liquid state therein into a gaseous state, and for this purpose, a heat medium using water or air as a heat source is used.

That is, the liquefied natural gas is vaporized by heat exchange with the heat medium, whereby the evaporated vapor becomes to be generated.

In addition, as shown in FIG. 2, the carburetor module 500 may be installed by being connected to the second bunkering station 230, but the installation location is not limited thereto.

As described above, when the carburetor module 500 is installed by being connected to the second bunkering station 230, the evaporated vapor generated by the carburetor module 500 is transferred to the second bunkering station 230.

In addition, the carburetor module 500 and the second bunkering station 230 may be connected to each other with a loading arm LA or a supply hose SH.

The loading arm LA may have one side connected to the carburetor module 500 and an opposite side provided with a coupler DC connected to the second bunkering station 230.

In addition, the supply hose SH may be configured in the form of the flexible hose that provides excellent flexibility and bending resistance in the corrugated shape and may have one side connected to the carburetor module 500 and an opposite side provided with a connection part connected to the second bunkering station 230.

That is, the loading arm LA or the supply hose SH is a passageway through which the evaporated vapor generated in the carburetor module 500 is transferred, and the evaporated vapor is transferred to the second bunkering station 230 through the passageway.

Thereafter, the evaporated vapor naturally generated inside the second bunkering station 230 and the evaporated vapor generated in the carburetor module 500 and delivered to the second bunkering station 230 become to be gathered, whereby the evaporated vapor gathered above passes through the first bunkering station 210 via the supply hose SH, thereby being transferred to the reliquefaction module 600.

That is, the evaporated vapor, generated by artificially vaporizing the liquefied natural gas by adding the carburetor module 500, is provided to the reliquefaction module 600, whereby the performance of the reliquefaction module 600 may be evaluated.

Finally, summarized on the basis of the above, the LNG bunkering equipment test and evaluation system according to the present disclosure introduces a simulation module 400 capable of simulating the maritime situation, thereby simulating various situations of sea areas. Consequentially, the present disclosure provides a system capable of evaluating the stability and performance of the actual operation of the LNG bunkering equipment product.

It will be obvious to those of ordinary skill in the art that the present disclosure is not limited to the above embodiments and may be implemented with various modifications or variations within the scope not departing from the technical gist of the present disclosure.

What is claimed is:

1. A liquefied natural gas (LNG) bunkering equipment test and evaluation system, comprising:
    a storage tank module configured to store a liquefied natural gas;
    a bunkering module configured to perform bunkering by being supplied with the liquefied natural gas stored in the storage tank module;
    a supply module for connecting the storage tank module and the bunkering module to each other and the supply module is configured to supply the liquefied natural gas stored in the storage tank module to the bunkering module;

a simulation module provided at a part under the bunkering module and the supply module, and the simulation module causes both the bunkering module and the supply module to move linearly and rotationally based on a monitored flow of seawater; and the simulation module is further configured to simulate a maritime situation by giving a fluidity to the bunkering module and the supply module, wherein the maritime situation is determined by factors that cause fluctuation of a ship comprising sea conditions, direction and strength of ocean currents, wind direction, and wind speed; and wherein the supply module comprises:

at least one pump installed at one side of the storage tank module and the at least one pump is configured to discharge the liquefied natural gas stored in the storage tank module to an outside; and a supply line connected to the at least one pump and the supply line is served as a passageway, wherein a discharged liquefied natural gas is transferred to the bunkering module through the supply line.

2. The LNG bunkering equipment test and evaluation system of claim 1, wherein the supply line is configured to have one side connected to the at least one pump, and the supply line has an opposite side provided with a loading arm connecting with the bunkering module or the supply line has the opposite side connecting with the bunkering module.

3. The LNG bunkering equipment test and evaluation system of claim 1, wherein the bunkering module comprises:

a first bunkering station configured to receive the liquefied natural gas from the storage tank module, and to store the liquefied natural gas in the first bunkering station, and to outflow the liquefied natural gas stored the first bunkering station; and a second bunkering station configured to receive the liquefied natural gas flowing out from the first bunkering station.

4. The LNG bunkering equipment test and evaluation system of claim 3, wherein the first bunkering station and the second bunkering station are connected to each other by at least one supply hose, wherein the at least one supply hose has couplers, wherein the first bunkering station and the second bunkering station are connected to the couplers, respectively, at opposite ends.

5. The LNG bunkering equipment test and evaluation system of claim 3, wherein each of the first bunkering station and the second bunkering station comprises an emergency stop unit configured to block a flow path of the bunkering module by detecting an abnormal situation of the bunkering module, wherein the abnormal situation includes an abnormal connection state of the bunkering module.

6. The LNG bunkering equipment test and evaluation system of claim 1, further comprising:

at least one reliquefaction module configured to reliquefy an evaporated vapor generated from the liquefied natural gas and to retransfer a reliquefied evaporated vapor to the storage tank module.

7. The LNG bunkering equipment test and evaluation system of claim 6, wherein the at least one reliquefaction module uses a nitrogen gas as a refrigerant, and the evaporated vapor is reliquefied through a heat exchange with the nitrogen gas.

8. The LNG bunkering equipment test and evaluation system of claim 7, wherein the at least one reliquefaction module comprises:

a liquefied nitrogen supplier configured to supply liquefied nitrogen generated by cooling the nitrogen gas under pressure; and a heat exchanger configured to reliquefy the evaporated vapor through the heat exchange between the liquefied nitrogen supplied from the liquefied nitrogen supplier and the evaporated vapor.

9. The LNG bunkering equipment test and evaluation system of claim 6, further comprising:

a carburetor module configured to generate the evaporated vapor by vaporizing the liquefied natural gas and to transfer the evaporated vapor to the at least one reliquefaction module.

* * * * *